(12) United States Patent
Robinson (10) Patent No.: US 10,035,688 B1
(45) Date of Patent: Jul. 31, 2018

(54) TIRE HANDLING CART

(71) Applicant: Kevin A Robinson, Brighton, CO (US)

(72) Inventor: Kevin A Robinson, Brighton, CO (US)

( * ) Notice: Subject to any disclaimer, the term of this patent is extended or adjusted under 35 U.S.C. 154(b) by 0 days.

(21) Appl. No.: 15/823,420

(22) Filed: Nov. 27, 2017

Related U.S. Application Data (60) Provisional application No. 62/429,437, filed on Dec. 2, 2016.

(51) Int. Cl.
| | | |
|---|---|---|
| *B60B 29/00* | (2006.01) | |
| *B66F 5/00* | (2006.01) | |
| *B60B 30/10* | (2006.01) | |
| *B60B 30/04* | (2006.01) | |
| *B66F 7/06* | (2006.01) | |
| *B60B 33/00* | (2006.01) | |

(52) U.S. Cl.
CPC .............. *B66F 5/00* (2013.01); *B60B 29/001* (2013.01); *B60B 29/002* (2013.01); *B60B 30/04* (2013.01); *B60B 30/10* (2013.01); *B60B 33/0005* (2013.01); *B66F 7/0625* (2013.01); *B60B 2900/111* (2013.01)

(58) Field of Classification Search
CPC .. B60B 33/0005; B60B 29/001; B60B 29/002
USPC .......................................................... 414/427
See application file for complete search history.

(56) References Cited

U.S. PATENT DOCUMENTS

| | | | |
|---|---|---|---|
| 3,937,343 A | 2/1976 | Spulak | |
| 3,951,287 A | 4/1976 | Cofer | |
| 4,401,405 A | 8/1983 | Ealet | |
| 4,571,142 A | 2/1986 | Niewald | |
| 4,690,605 A | 9/1987 | Coccaro | |
| 5,230,598 A * | 7/1993 | Steves, Jr. ............. | B60B 29/002 254/2 R |
| 6,382,644 B1 * | 5/2002 | Rawlings .............. | B60B 29/002 280/47.35 |
| 7,597,524 B2 | 10/2009 | Hernandez | |
| 7,611,126 B2 | 11/2009 | Vesa | |
| 7,988,402 B2 * | 8/2011 | Adams .................. | B60B 29/002 414/426 |

(Continued)

FOREIGN PATENT DOCUMENTS

| | | |
|---|---|---|
| CA | 1037434 A1 | 8/1978 |
| CA | 2882344 A1 | 8/2015 |

(Continued)

*Primary Examiner* — Jonathan Snelting
(74) *Attorney, Agent, or Firm* — QUICKPATENTS, LLC; Kevin Prince (57) ABSTRACT

A cart is disclosed having a rigid base with a plurality of cutouts, bottom and top sides, and at least one peripheral edge. The bottom side has at least one removable, lockable caster at each bottom side corner. The cart has a rigid cradle with bottom, back, and top sides, and at least one peripheral edge. The opposing sides of the top side have horizontal rollers mounted on flanges. The cradle has a handle, tool hooks, a lug nut tray, and a wheel retainer. An actuating lift coupled between and centered on the base top and cradle bottom is movable between a lowered position and a raised position. The base has an elevated portion and is switchable between raised and lowered configurations, setting the cradle's maximum height, by removing the casters and decoupling the lift from the base; flipping over the base; reattaching the casters; and recoupling the lift.

14 Claims, 7 Drawing Sheets

(56) References Cited

U.S. PATENT DOCUMENTS

| | | | |
|---|---|---|---|
| 8,061,952 B1 * | 11/2011 | Scherden | ............... B60B 30/02 280/79.4 |
| 8,172,255 B1 | 5/2012 | Martin | |
| 8,684,654 B2 * | 4/2014 | Bardin | ................... B60B 30/02 187/231 |
| 2006/0181057 A1 | 8/2006 | Kollarits | |
| 2008/0181755 A1 * | 7/2008 | Harris | .................. B60B 29/002 414/427 |
| 2009/0136329 A1 | 5/2009 | Roberts | |
| 2012/0057954 A1 | 3/2012 | Bardin | |
| 2015/0290972 A1 | 10/2015 | Minor | |
| 2016/0325586 A1 | 11/2016 | Mathieson | |

FOREIGN PATENT DOCUMENTS

| | | |
|---|---|---|
| CN | 2044950 U | 9/1989 |
| CN | 2170293 Y | 6/1994 |
| DE | 102011117669 A1 | 5/2013 |
| FR | 2847222 A1 | 5/2004 |
| KR | 1020100129408 A | 12/2010 |
| WO | 2016038117 A1 | 3/2016 |

* cited by examiner

TIRE HANDLING CART

CROSS-REFERENCE TO RELATED APPLICATIONS

This application claims the benefit of U.S. Provisional Patent Application 62/429,437, filed on Dec. 2, 2016, entitled TIRE ROTATION ASSISTANCE CART, and incorporated herein by reference.

STATEMENT REGARDING FEDERALLY SPONSORED RESEARCH AND DEVELOPMENT

Not Applicable.

FIELD OF THE INVENTION

This invention relates to vehicle maintenance devices, and more particularly to a shop cart for facilitating the handling wheels.

BACKGROUND

This invention relates to vehicle maintenance devices, and more particularly to a cart with a rigid base, a rigid cradle, a retainer on the cradle for holding a vehicle wheel securely in place thereon, and an adjustable-height lift coupled between the base and the cradle adapted to provide superior operator safety and ease-of-use, by means of: a design usable with vehicles elevated at various heights and fitted with various types of wheels; mechanisms engineered to eliminate awkward, dangerous, and injurious maneuvers when removing or installing a vehicle wheel; a lift actuator responsive to minimal force; a storage area for tools and wheel parts; and a compact, easy to maintain and transport chassis superior to large, fixedly-mounted wheel maintenance devices.

The prior art includes: U.S. Pat. No. 3,937,343A (Feb. 10, 1976); U.S. Pat. No. 3,951,287A (Apr. 20, 1976); CA Patent No. CA1037434A (Aug. 29, 1978); U.S. Pat. No. 4,401,405A (Aug. 30, 1983); U.S. Pat. No. 4,571,142A (Feb. 18, 1986); U.S. Pat. No. 4,690,605A (Sep. 1, 1987); CN Application No. CN2044950U (Sep. 27, 1989); CN Patent No. CN2170293Y (Jun. 29, 1994); FR Patent Application No. FR2847222A1 (May 21, 2004); U.S. Patent Application No. 20060181057A1 (Aug. 17, 2006); U.S. Patent Application No. 20090136329A1 (May 28, 2009); U.S. Pat. No. 7,597,524B2 (Oct. 6, 2009); U.S. Pat. No. 7,611,126B2 (Nov. 3, 2009); KR Patent No. KR1020100129408A (Dec. 9, 2010); U.S. Patent Application No. 20120057954A1 (Mar. 8, 2012); U.S. Pat. No. 8,172,255B1 (May 8, 2012); DE Patent Application No. DE102011117669A1 (May 8, 2013); CA Application No. CA2882344A1 (Aug. 20, 2015); U.S. Patent Application No. 20150290972A1 (Oct. 15, 2015); PCT Application No. WO2016038117A1 (Mar. 17, 2016); and U.S. Patent Application No. 20160325586A1 (Nov. 10, 2016). It is desirable to have an improved cart that is superior to any that is disclosed or suggested in the identified references.

SUMMARY OF THE INVENTION

The present device is a cart for facilitating handling by a user of a wheel of a vehicle above a support surface. The cart comprises: a rigid base having a bottom side, a top side, and at least one peripheral edge. The bottom side is adapted for resting on the support surface. In some preferred embodiments, the bottom side of the base further includes an at least one caster adapted to allow the cart to roll across the support surface. More preferably, the at least one caster includes a lock for inhibiting rolling of the cart across the support surface. In other preferred embodiments, the base further comprises a plurality of cutouts which reduce the total weight of the cart. The top side of the base has a center.

The cart further comprises a rigid cradle having a bottom side, a top side, and at least one peripheral edge. The bottom side and the top side have a co-aligned center. The bottom side also has a lift mount at the center. In some preferred embodiments, the cradle further includes a pair of horizontal rollers, a front flange, and a rear flange. The front flange and the rear flange project upwardly from the top side of the cradle. Both the front flange and the rear flange support opposing sides of at least one of the rollers. Each of the rollers are on opposing sides of the center of the top side. Each of the rollers, when jointly supporting the wheel, allow the wheel to rotate in place. In such preferred embodiments, the front flange more preferably includes an arcuate gap adapted for clearing the wheel when the cart is rolled under the vehicle. In other preferred embodiments, the cart further includes a handle proximate a back side of the cradle. The handle enables easier movement of the cart across the support surface by the user.

Some preferred embodiments also further include a lug nut tray proximate the back side of the cradle. The lug nut tray is adapted to hold a plurality of wheel lug nuts. Other preferred embodiments further include at least one tool hook projecting away from either the bottom side or the rear flange of the cradle.

A retainer is fixed with the cradle for selectively securing the wheel to the cradle. A lift is coupled at a bottom end thereof to the center of the top side of the base. The lift extends upwardly therefrom and has at a top end a mounting interface. The mounting interface is coupled with the lift mount of the cradle. The lift also has an actuator. The lift is movable between a lowered position and a raised position upon actuation of the actuator.

In some preferred embodiments including the at least one caster, the base further includes an elevated portion along a longitudinal axis thereof. In such embodiments, the at least one caster is removably fixed with four corners of the bottom side of the base. The base, in a raised configuration, has the elevated portion elevated above the corners of the base and the casters so as to raise the maximum height of the cradle in the raised position. The base, in a lowered configuration, has the elevated portion lower than the corners of the base and the casters so as to lower the maximum height of the cradle in the raised position. In such embodiments, the casters and the lift are removably fixable to either the top side or the bottom side of the base. To switch the base between the lowered configuration and the raised configuration, the user need only: remove the casters and decouple the lift from the base; flip over the base; reattach the casters to the base; and recouple the lift to the base. Preferred embodiments featuring the elevated portion may also more preferably further include a lift extension.

In use, the cradle of the cart supports the wheel between the lowered position proximate the support surface and the raised position.

The present invention is a cart adapted to provide superior operator safety and ease-of-use when used to remove, install, or perform other maintenance on a vehicle wheel. It allows a person to avoid manually lifting a wheel from a vehicle and moving the wheel to the ground or other support surface, or from there back to the vehicle. Such manual lifting can result in damage to the wheel by accidental drop or collision, as well as personal injury to maintenance personnel due to: potentially dropping or striking the wheel on a body part; or suffering muscle strain or some other bodily injury. The risk of personal injury—and attendant loss of productivity and potentially high financial liability for employers (e.g.: workman's compensation and other legal claims), and lost wages and medical expenses for maintenance worker employees—is particularly grave where the wheel is especially large or otherwise difficult to manipulate unassisted. The cart greatly mitigates the risk of such property damage and injury by means of: a design usable with vehicles elevated at various heights and fitted with various types of wheels; mechanisms engineered to eliminate awkward, dangerous, and injurious maneuvers when removing or installing a vehicle wheel; a lift actuator responsive to minimal force; a storage area for tools and wheel parts; and a compact, easy to maintain and transport chassis that is superior to large, fixedly-mounted wheel maintenance devices.

The cart also provides considerable advantages during normal use that are not related to user safety. For example, the ability to rest a wheel on the cart's cradle and freely rotate the wheel using the rollers, combined with the ability to adjust the height of the cradle to match the vehicle's elevation above the support surface allows the user to line up the wheel with any vehicle's wheel well lug nut holes or studs, and install the lug nuts to hold the wheel in place on the vehicle. Once installation is complete, the cradle may be lowered and the cart moved out of the way. This greatly simplifies installing a wheel on a vehicle while also considerably reducing the required physical effort. Removing a wheel is equally simplified: the user need merely roll the cart under a vehicle tire and use the lift to raise the cradle to a sufficient height to allow the cradle to fully interface with the wheel. Once the wheel is secure on the cradle, the user may remove the lug nuts from the wheel and disengage the wheel from the vehicle by rolling the cart, now carrying the wheel, away from the vehicle. Once a wheel has been placed on the cart, it may be moved wherever the user wishes with minimal effort. Little, if any, direct lifting of the wheel by a user is required during either installation or removal.

For extra convenience, the cart contains storage spaces and hooks for ready-to-use lug nuts and any necessary hand tools, as well as a handle for easily moving the cart across the support surface. The cart's features make it ideal for use in vehicle inspection or tire rotation processes. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element. Finally, "Detailed Description" refers to this Detailed Description of the Preferred Embodiment.

Figure 1:
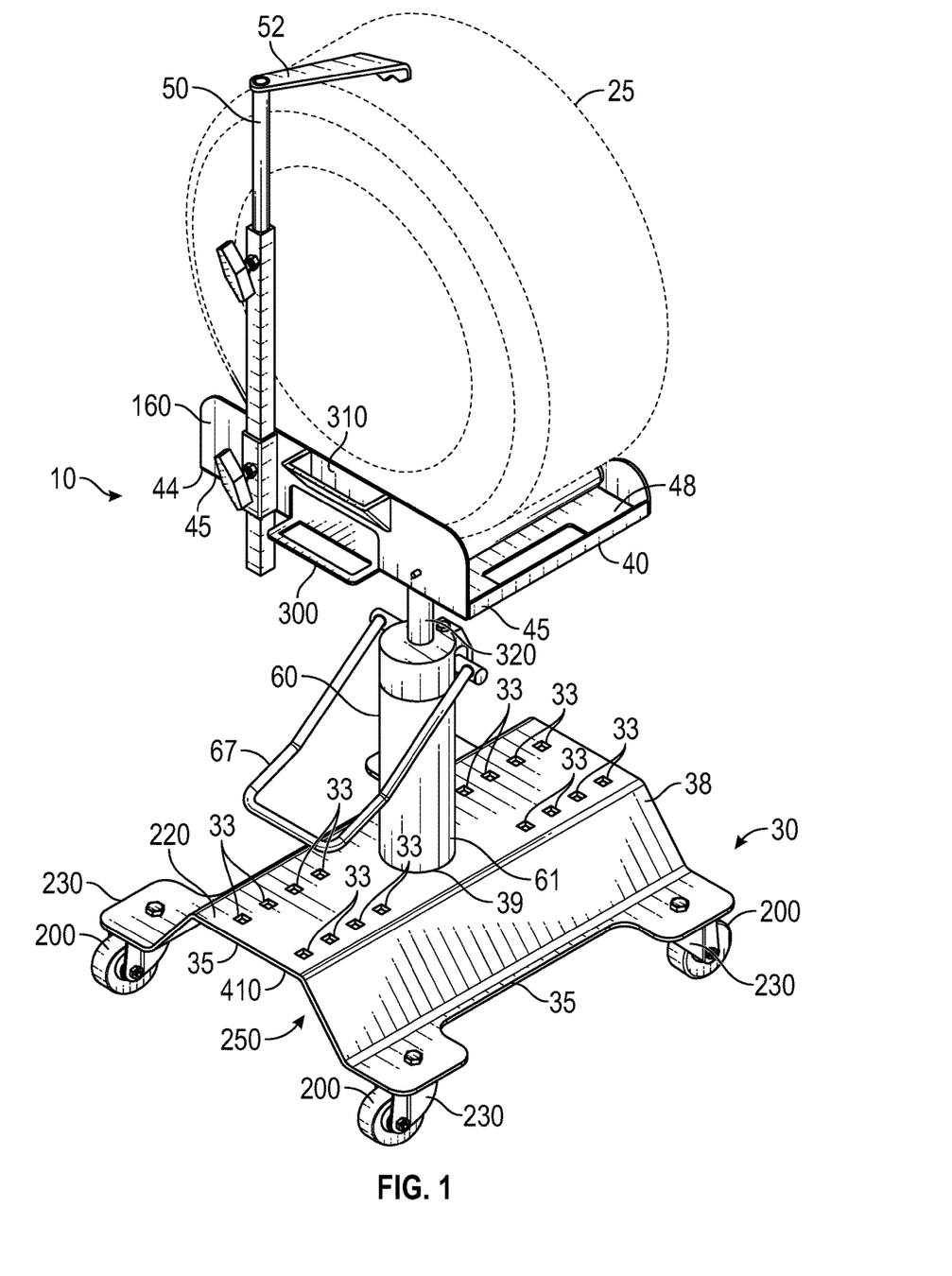
FIG. 1 is a rear perspective view of one embodiment of the invention, shown configured with the base in a raised configuration with a number of cutouts and featuring a wheel in the cradle.
Figure 2:
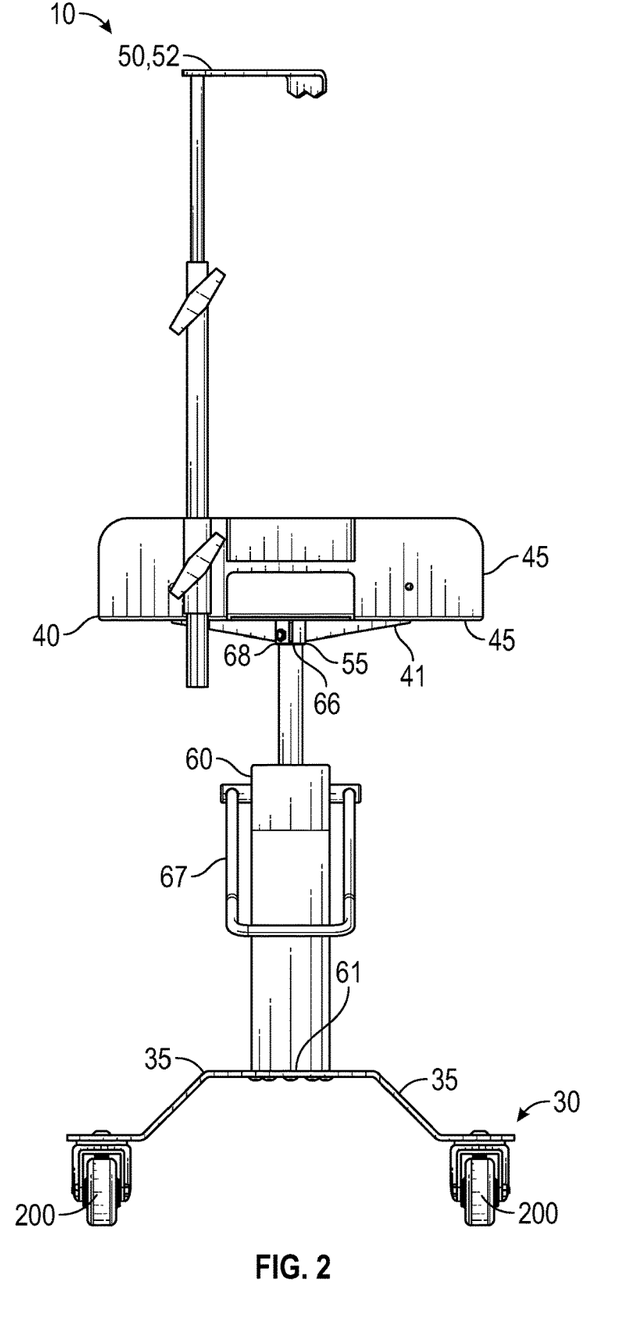
FIG. 2 is a rear elevational view of one embodiment of the invention; shown configured with the base in the raised configuration and a stabilizer bar.
Figure 8:
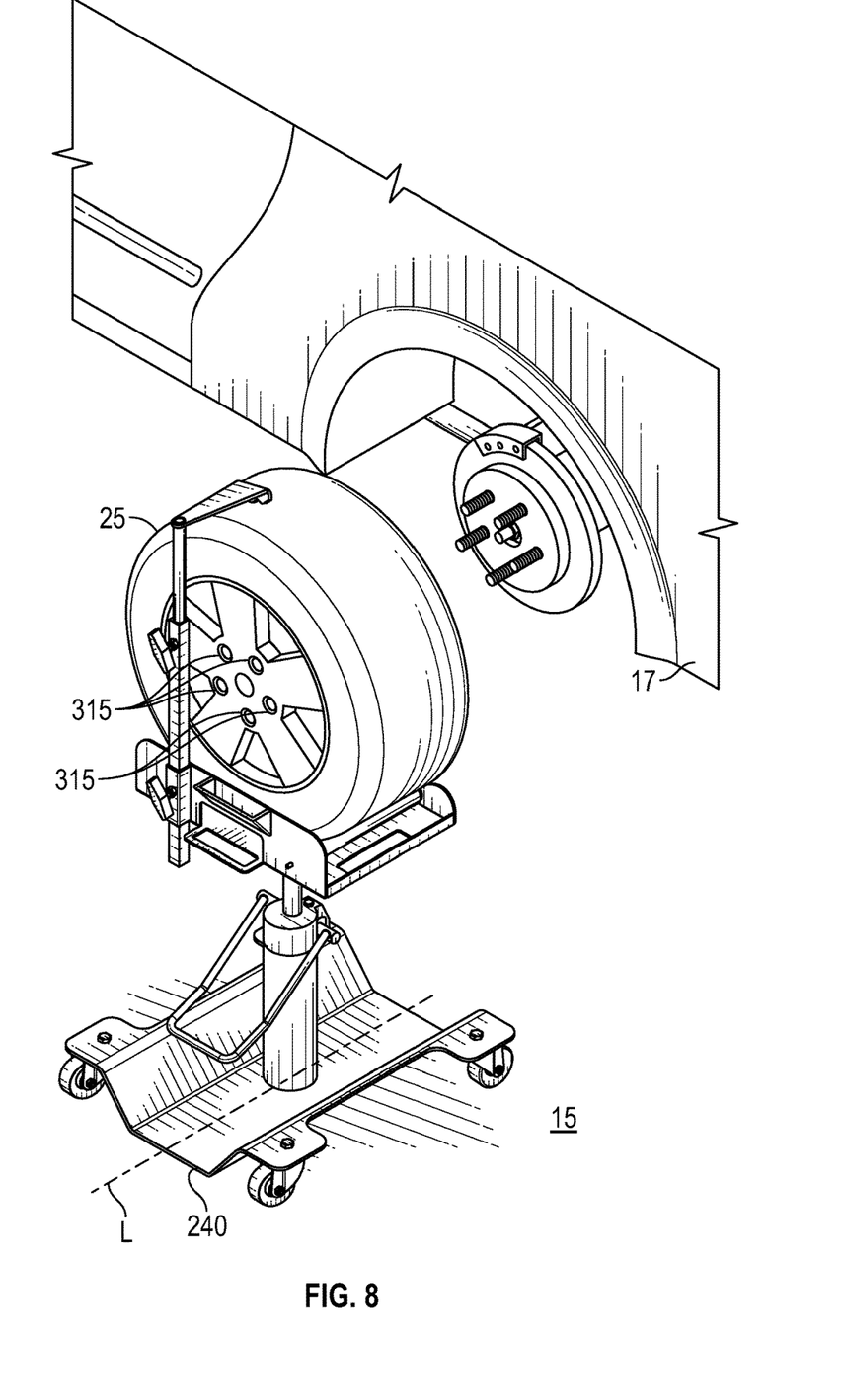
FIG. 8 is a rear perspective view of one embodiment of the invention, shown configured with the base in the lowered configuration and featuring the wheel with wheel lug nuts in the cradle.

FIGS. 1-8 illustrate a cart 10 (FIGS. 1-5) for facilitating handling by a user 20 (not shown) of a wheel 25 (FIGS. 1, 8) of a vehicle 17 (FIG. 8) above a support surface 15 (FIG. 8). Herein, the wheel 25 may refer to: a complete wheel-tire assembly; a naked wheel without a tire; or a tire with no wheel, as applicable. The cart 10 comprises: a rigid base 30 (FIGS. 1-5, 7) having a bottom side 31 (FIG. 7), a top side 38 (FIG. 1), and at least one peripheral edge 35 (FIGS. 1-2). The base 30 may be in one of any number of practical shapes that are mechanically feasible for operation of the cart 10, including but not limited to: square, rectangular, round, ovaloid, or polygonic. The bottom side 31 is adapted for resting on the support surface 15. In some preferred embodiments, the bottom side 31 of the base 30 further includes an at least one caster 200 (FIGS. 1-5, 7) adapted to allow the cart 10 to roll across the support surface 15. The at least one caster 200 may be a caster, a wheel, a roller, a slide pad, or any other mechanism suitable for long-term use to allow the cart 10 to move with minimal friction across the support surface 15. More preferably, the at least one caster 200 includes a lock 210 (FIG. 4) for inhibiting rolling of the cart 10 across the support surface 15.

In other preferred embodiments, the base 30 further comprises a plurality of cutouts 33 (FIG. 1) which reduce the total weight of the cart 10. Any number of the cutouts 33, in any feasible shape, may be used so long as the presence of the cutouts 33 does not negatively impact the structural integrity or function of the cart 10. The top side 38 of the base 30 has a center 39 (FIG. 1).

Figure 3:
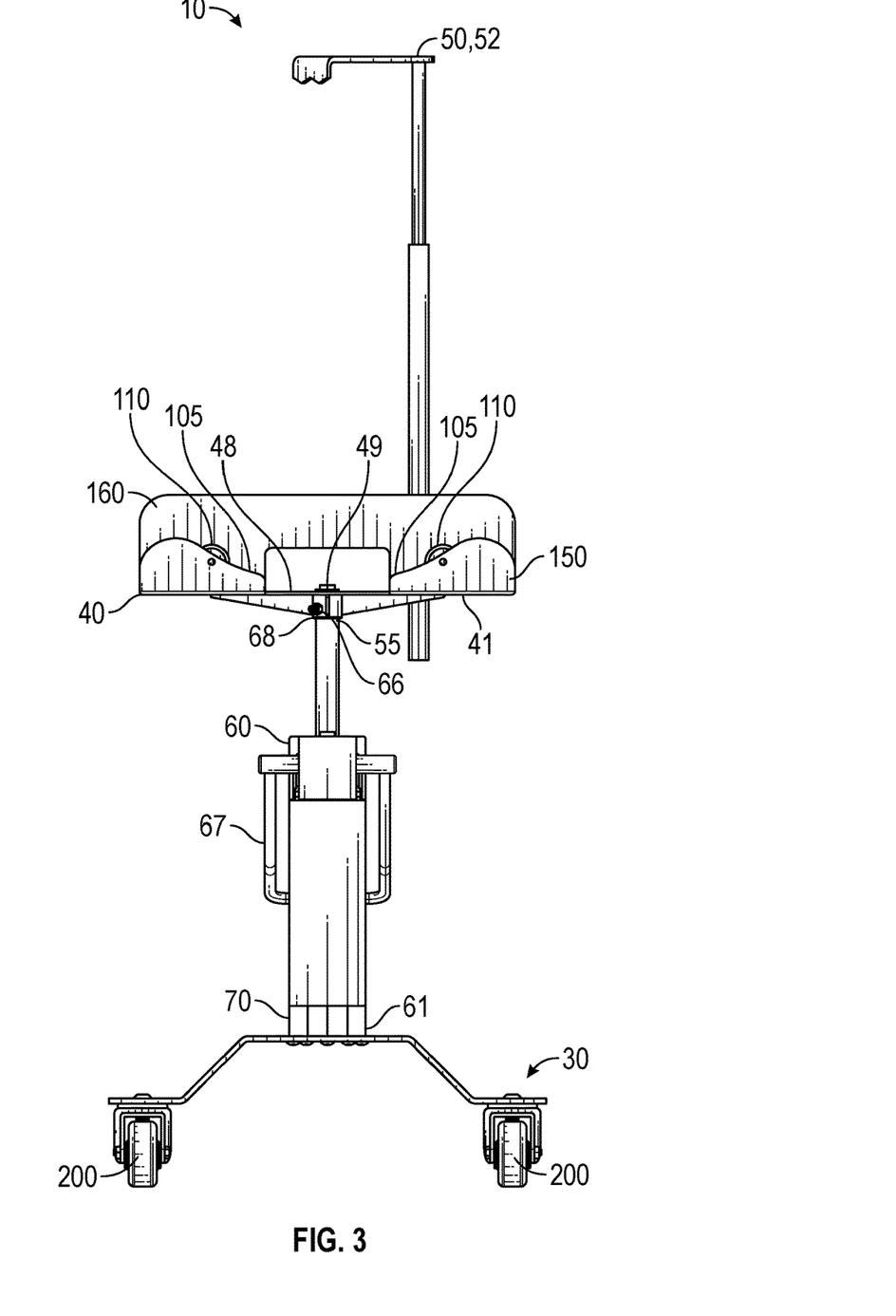
FIG. 3 is a front elevational view of one embodiment of the invention, shown configured with the base in the raised configuration.
Figure 4:
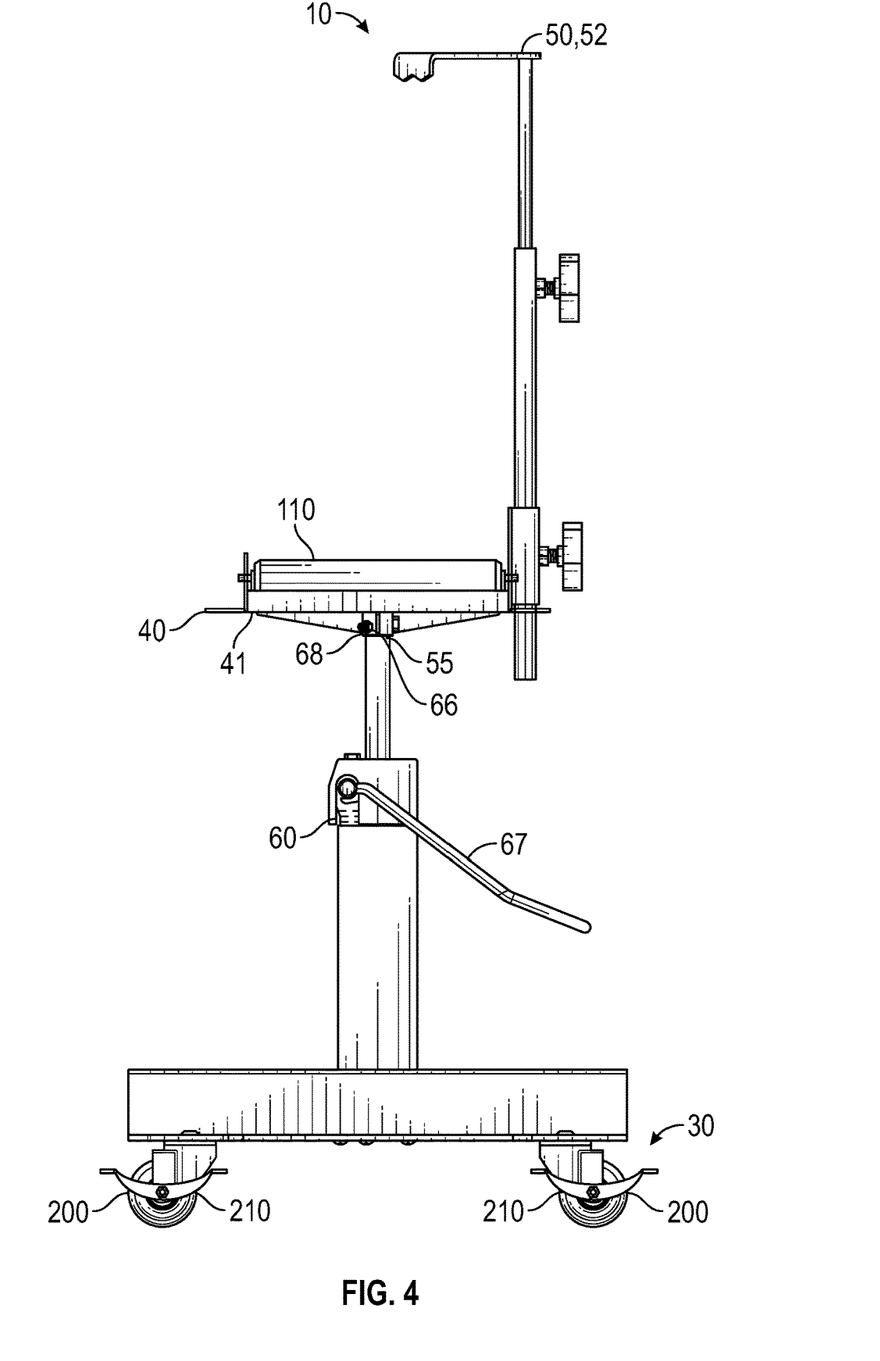
FIG. 4 is a left side elevational view of one embodiment of the invention, shown configured with the base in the raised configuration and casters including locks.
Figure 5:
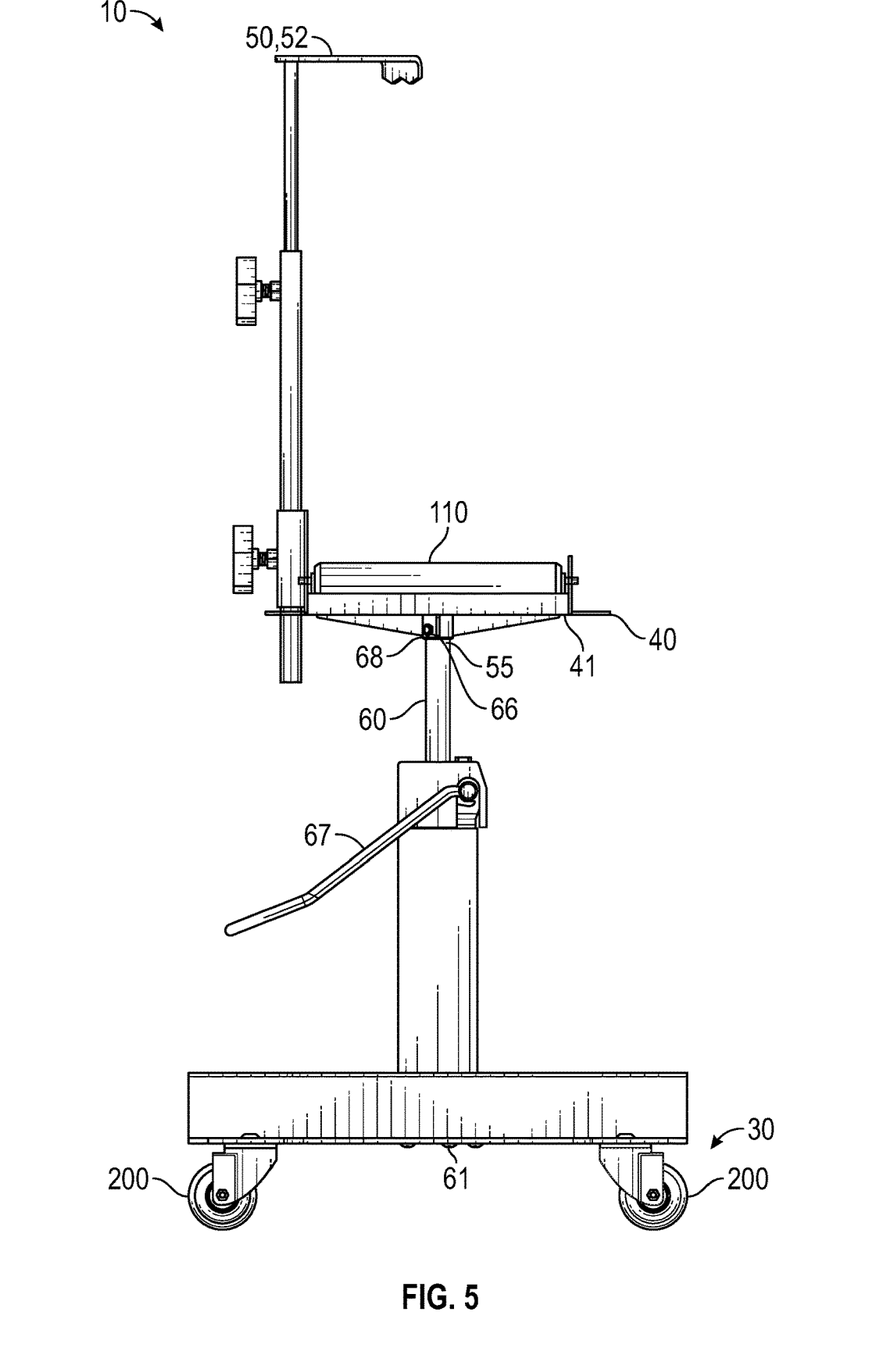
FIG. 5 is a right side elevational view of one embodiment of the invention, shown configured with the base in the raised configuration and casters without locks.
Figure 6:
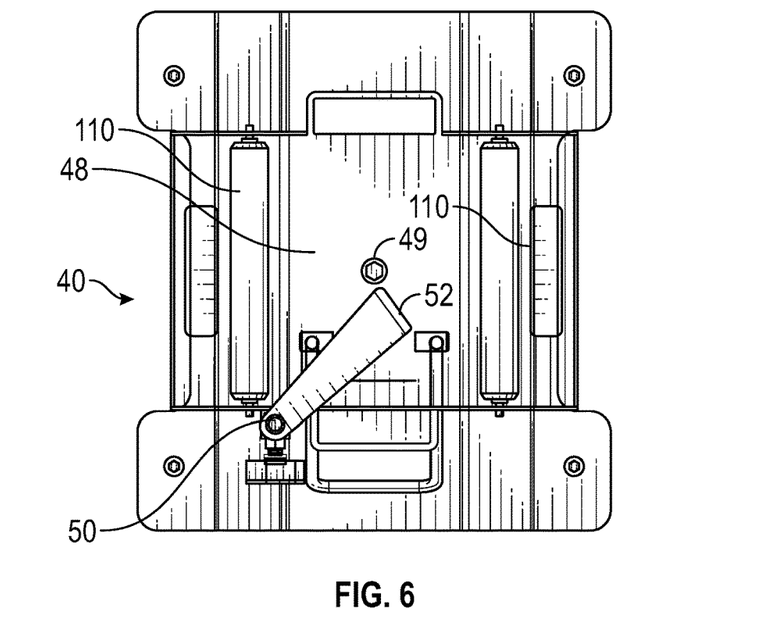
FIG. 6 is a top plan view of one embodiment of the invention, shown configured with the base in the raised configuration.
Figure 7:
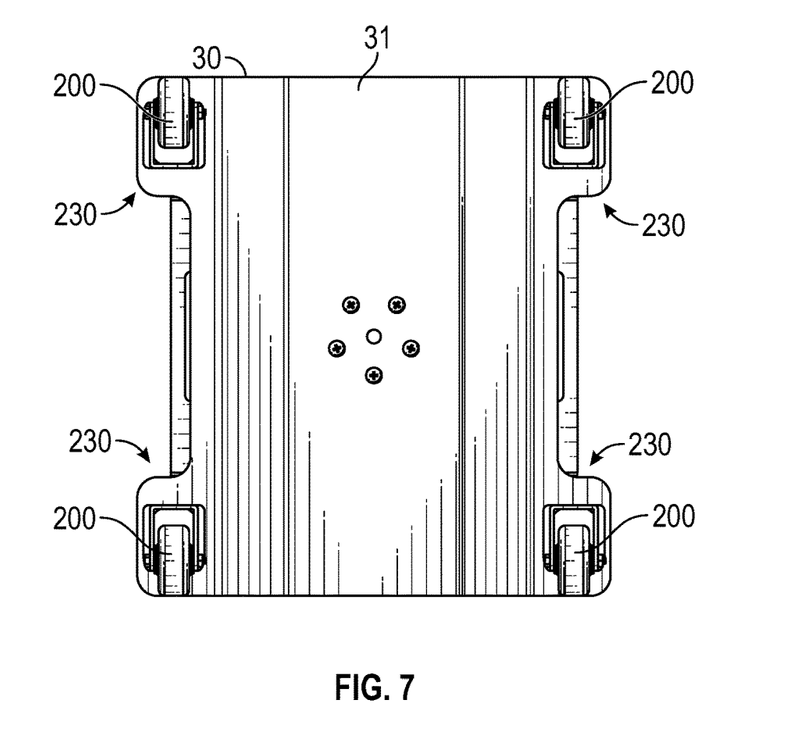
FIG. 7 is a bottom plan view of one embodiment of the invention, shown configured with the base in the raised configuration.

The cart 10 further comprises a rigid cradle 40 (FIGS. 1-6) having a bottom side 41 (FIGS. 2-5), a top side 48 (FIGS. 1, 3, 6), and at least one peripheral edge 45 (FIGS. 1-2). The cradle 40 may be of the same shape as the base 30, or may be of a different shape, so long as the entire cart 10 remains stable and balanced so that the cart 10 is safe for the intended use of the cart 10. The bottom side 41 and the top side 48 have a co-aligned center 49 (FIGS. 3, 6). The bottom side 41 also has a lift mount 55 (FIGS. 2-5) at the center 49. In some preferred embodiments, the cradle 40 further includes a pair of horizontal rollers 110 (FIGS. 3-6), a front flange 150 (FIG. 3), and a rear flange 160 (FIG. 1, 3). The rollers 110 may be of any length depending on the overall size of the cart 10 and the cradle 40. For example, in some embodiments, the rollers 110 may be twelve inches long. The front flange 150 and the rear flange 160 project upwardly from the top side 48 of the cradle 40. Both the front flange 150 and the rear flange 160 support opposing sides of at least one of the rollers 110. Each of the rollers 110 are on opposing sides of the center 49 of the top side 48. Each of the rollers 110, when jointly supporting the wheel 25, allow the wheel 25 to rotate in place. In such preferred embodiments, the front flange 150 more preferably includes an arcuate gap 105 (FIG. 3) adapted for clearing the wheel 25 when the cart 10 is rolled under the vehicle 17. In other preferred embodiments, the cart 10 further includes a handle 300 (FIG. 1) proximate a back side 44 (FIG. 1) of the cradle 40. The handle 300 enables easier movement of the cart 10 across the support surface 15 by the user.

Some preferred embodiments also further include a lug nut tray 310 (FIG. 1) proximate the back side 44 of the cradle 40. The lug nut tray 310 is adapted to hold a plurality of wheel lug nuts 315 (FIG. 8). Other preferred embodiments further include at least one tool hook 320 (FIG. 1) projecting away from either the bottom side 41 or the rear flange 160 of the cradle 40.

A retainer 50 (FIGS. 1-6) is fixed with the cradle 40 for selectively securing the wheel 25 to the cradle 40. In some preferred embodiments, the retainer 50 is a strap (not shown). The strap may be made from leather, vinyl, thermoplastic, elastomer, or any other mechanically similar natural or synthetic material suitable for long-term use. In other preferred embodiments, the retainer 50 is a stabilizer bar 52 (FIGS. 1-6).

A lift 60 (FIGS. 1-5) is coupled at a bottom end 61 (FIGS. 1-3, 5) thereof to the center 39 of the top side 38 of the base 30. The lift 60 extends upwardly therefrom and has at a top end 68 (FIGS. 2-5) a mounting interface 66 (FIGS. 2-5). The mounting interface 66 is coupled with the lift mount 55 of the cradle 40. The lift 60 also has an actuator 67 (FIGS. 1-5). The actuator 67 may be implemented in any form that facilitates the purpose of the cart 10. In particular, but without suggesting any limitations on the type of the actuator 67 used, the actuator 67 may be a jack. When the actuator 67 is a jack, it may be a post-style jack. Ideally, the jack would be of a one-step design. Alternatively, the actuator 67 may be a foot pedal. The foot pedal may be configured for a manual pump, or to control a battery-operated, automated implementation of the lift 60. As an additional alternative, the actuator 67 may be a hand crank. The lift 60 is movable between a lowered position 400 (FIG. 8) and a raised position 410 (FIG. 1) upon actuation of the actuator 67. In various preferred embodiments, the lift 60 may be hydraulic, pneumatic, motorized, or constructed from any other suitable mechanism capable of enabling the lift to perform the function of the lift 60 as described herein.

In some preferred embodiments including the at least one caster 200, the base 30 further includes an elevated portion 220 (FIG. 1) along a longitudinal axis L (FIG. 8) thereof. In such embodiments, the at least one caster 200 is removably fixed with four corners 230 (FIGS. 1, 7) of the bottom side 31 of the base 30. The base 30, in a raised configuration 250 (FIG. 1), has the elevated portion 220 elevated above the corners 230 of the base 30 and the casters 200 so as to raise the maximum height of the cradle 40 in the raised position 410. The base 30, in a lowered configuration 240 (FIG. 8), has the elevated portion 220 lower than the corners 230 of the base 30 and the casters 200 so as to lower the maximum height of the cradle 40 in the raised position 410. In such embodiments, the casters 200 and the lift 60 are removably fixable to either the top side 38 or the and the raised configuration 250, the user need only: remove the casters 200 and decouple the lift 60 from the base 30; flip over the base 30; reattach the casters 200 to the base 30; and recouple the lift 60 to the base 30. Preferred embodiments featuring the elevated portion 220 may also more preferably further include a lift extension 70 (FIG. 3).

In use, the cradle 40 of the cart 10 supports the wheel 25 between the lowered position 400 proximate the support surface 15 and the raised position 410.

While a particular form of the invention has been illustrated and described, it will be apparent that various modifications can be made without departing from the spirit and scope of the invention. For example, the vehicle 17 may be any type of wheeled vehicle, whether intended for use in non-commercial, commercial, freight, military, government, or any other sector. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Any element in a claim that does not explicitly state "means for" performing a specified function or "step for"

performing a specified function is not to be interpreted as a "means" or "step" clause as specified in 35 U.S.C. § 112(f). In particular, any use of "step of" in the claims herein is not intended to invoke the provisions of 35 U.S.C. § 112(f).

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A cart for facilitating handling by a user of a wheel of a vehicle above a support surface, comprising:
    a rigid base having a bottom side, a top side, and at least one peripheral edge, the bottom side adapted for resting on the support surface, and the top side having a center, the bottom side further including at least one caster adapted to allow the cart to roll across the support surface;
    a rigid cradle having a bottom side, a top side, and at least one peripheral edge, the bottom side and the top side having a co-aligned center, and the bottom side having a lift mount at the center;
    a retainer fixed with the cradle for selectively securing the wheel to the cradle; and
    a lift coupled at a bottom end thereof to the center of the top side of the base and extending upwardly therefrom, the lift having at a top end a mounting interface coupled with the lift mount of the cradle, and an actuator, wherein the lift is movable between a lowered position and a raised position upon actuation of the actuator;
    the base further including an elevated portion along a longitudinal axis thereof, and wherein the at least one caster is removably fixed with at least one corner of the bottom side of the base;
    whereby the cradle of the cart supports the wheel between the lowered position proximate the support surface and the raised position, and whereby the base in a raised configuration has the elevated portion elevated above the at least one corner of the base and the at least one caster so as to raise the maximum height of the cradle in the raised position, and whereby the base in a lowered configuration has the elevated portion lower than the at least one corner of the base and the at least one caster so as to lower the maximum height of the cradle in the raised position, the at least one caster and lift being fixable to either the top side or bottom side of the base.

2. The cart of claim 1 wherein the cradle further includes a pair of horizontal rollers, and a front flange and a rear flange projecting upwardly from the top side of the cradle, both the front flange and the rear flange supporting opposing sides of at least one of the rollers, each of the rollers on opposing sides of the center of the top side;
    whereby each of the rollers when jointly supporting the wheel allow the wheel to rotate in place.

3. The cart of claim 2 wherein the front flange includes an arcuate gap adapted for clearing the wheel when the cart is rolled under the vehicle.

4. The cart of claim 2 further including at least one tool hook projecting away from the rear flange of the cradle.

5. The cart of claim 1 wherein the at least one caster includes a lock for inhibiting rolling of the cart across the support surface.

6. The cart of claim 1 wherein the lift is a hydraulic lift.

7. The cart of claim 1 wherein the lift is a pneumatic lift.

8. The cart of claim 1 wherein the lift is a motorized lift.

9. The cart of claim 1 further including a handle proximate a back side of the cradle.

10. The cart of claim 1 wherein the base further comprises a plurality of cutouts.

11. The cart of claim 1 further including a lug nut tray proximate a back side of the cradle and adapted to hold a plurality of wheel lug nuts.

12. The cart of claim 1 further including at least one tool hook projecting away from the bottom side of the cradle.

13. The cart of claim 1 where the retainer is a stabilizer bar.

14. The cart of claim 1 further including a lift extension fixed between the lift and the base.

* * * * *